(12) United States Patent
Yoshimura et al.

(10) Patent No.: US 8,189,255 B2
(45) Date of Patent: May 29, 2012

(54) ALL SOLID STATE TYPE REFLECTION LIGHT CONTROL ELECTROCHROMIC ELEMENT EMPLOYING MAGNESIUM/TITANIUM ALLOY AND LIGHT CONTROL MEMBER

(75) Inventors: Kazuki Yoshimura, Aichi (JP); Kazuki Tajima, Aichi (JP); Shanhu Bao, Aichi (JP); Yasusei Yamada, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 373 days.

(21) Appl. No.: 12/520,406

(22) PCT Filed: Dec. 18, 2007

(86) PCT No.: PCT/JP2007/074345
§ 371 (c)(1),
(2), (4) Date: Jun. 19, 2009

(87) PCT Pub. No.: WO2008/075695
PCT Pub. Date: Jun. 26, 2008

(65) Prior Publication Data
US 2009/0323159 A1 Dec. 31, 2009

(30) Foreign Application Priority Data
Dec. 19, 2006 (JP) ................. 2006-340763

(51) Int. Cl.
*G02F 1/153* (2006.01)
(52) U.S. Cl. ......... 359/273; 359/267; 359/270; 359/274
(58) Field of Classification Search .............. 359/265, 359/267, 270, 273, 274
See application file for complete search history.

(56) References Cited

U.S. PATENT DOCUMENTS

| | | | | |
|---|---|---|---|---|
| 5,253,100 A * | 10/1993 | Yang et al. | ............ | 359/266 |
| 6,023,364 A * | 2/2000 | Kobayashi et al. | ........ | 359/265 |
| 6,647,166 B2 | 11/2003 | Richardson | | |
| 7,259,902 B2 | 8/2007 | Yoshimura et al. | | |
| 7,414,772 B2 * | 8/2008 | Yoshimura et al. | ........ | 359/275 |
| 7,545,551 B2 * | 6/2009 | Yoshimura et al. | ........ | 359/273 |
| 2002/0089732 A1 | 7/2002 | Ouwerkerk et al. | | |
| 2003/0169476 A1 | 9/2003 | Yoshimura | | |
| 2003/0227667 A1 | 12/2003 | Ouwerkerk et al. | | |
| 2005/0206990 A1 | 9/2005 | Yoshimura et al. | | |

(Continued)

FOREIGN PATENT DOCUMENTS
JP 2000 204862 7/2000
(Continued)

*Primary Examiner* — Loha Ben
(74) *Attorney, Agent, or Firm* — Oblon, Spivak, McClelland, Maier & Neustadt, L.L.P.

(57) ABSTRACT

The present invention provides an all solid state type reflection light control electrochromic element and a light control member that uses this element, relates to an all solid state type reflection light control electrochromic element, which is a magnesium/titanium alloy reflection type light control element in which a multilayer thin film is formed on a transparent substrate, wherein at least a transparent conductive film layer, an ion storage layer, a solid electrolyte layer, a catalyst layer, and a reflection light control layer employing a magnesium/titanium alloy thin film are formed on the substrate; and a light control member which is incorporated with this reflection light control electrochromic element, and the present invention allows a reflection light control electrochromic element, which has a novel multilayer structure that is colorless when transparent and can be switched in a short time over a wide area, as well as a light control member incorporated with this element to be provided.

20 Claims, 7 Drawing Sheets

U.S. PATENT DOCUMENTS

2007/0076288 A1  4/2007  Yoshimura et al.

FOREIGN PATENT DOCUMENTS

| | | |
|---|---|---|
| JP | 2003 335553 | 11/2003 |
| JP | 2005 266029 | 9/2005 |
| JP | 2005 274630 | 10/2005 |
| JP | 2005 351933 | 12/2005 |
| JP | 2006 267670 | 10/2006 |
| JP | 2007 39283 | 2/2007 |
| JP | 2007 101723 | 4/2007 |
| JP | 2007 102197 | 4/2007 |
| JP | 2007 279595 | 10/2007 |
| JP | 2007 301778 | 11/2007 |
| WO | 02 42831 | 5/2002 |

\* cited by examiner ced back into
ALL SOLID STATE TYPE REFLECTION LIGHT CONTROL ELECTROCHROMIC ELEMENT EMPLOYING MAGNESIUM/TITANIUM ALLOY AND LIGHT CONTROL MEMBER

TECHNICAL FIELD

This invention relates to an all solid state type reflection light control electrochromic element employing a magnesium/titanium alloy thin film, and more particularly relates to a novel all solid state type reflection light control electrochromic element capable of electrically controlling the transmission of sunlight coming in through window glass, for example, by reversibly and electrically changing the glass surface from a mirror state to a transmissive state, and to a light control member in which said element is incorporated.

The present invention provides a novel all solid state type reflection light control electrochromic element that has high transmissivity when transparent and allows switching in a short period of time over a large surface area by employing a specific multilayer structure in which a magnesium/titanium alloy thin film is used for a reflection light control layer, which element can be used favorably in the window glass of buildings and vehicles to reduce the sensation of heat in a building or vehicle by controlling the sunlight transmissivity, for example, and also provides a light control member in which said electrochromic element is incorporated, and new technologies and new products related to said light control member.

BACKGROUND ART

The window glass in buildings is generally a major point of heat entry and exit. For example, the proportion of heat lost through windows when heating a building during the winter can reach about 48%, while the proportion of heat that enters through windows when cooling during the summer can be as high as about 71%. The same phenomenon applies to automobiles, in which window glass is also a major point of heat entry and exit. In automobiles, the ratio of window glass to interior space is higher than that in buildings, leaving little room for persons inside to sun's rays, which means that the interior of an automobile located in a hot weather environment can reach an extremely high temperature.

In measurements taken in a summer environment in Japan, the air temperature inside a parked automobile has been found to reach approximately 70° C. With respect to the temperature of the interior parts of an automobile, the top of the instrument panel may rise to nearly 100° C., while the ceiling may rise to nearly 70° C. It goes without saying that riding in an automobile under such conditions is uncomfortable. Also, since the temperature of interior parts does not go down quickly even when the interior is ventilated or air-conditioned, passengers continue to be radiated with radiant heat for a long time, and this greatly diminishes the level of comfort within the vehicle.

Light control glass capable of controlling the transfer of light and heat has been developed as a technology for solving these problems. There are several types of light control systems used in light control glass. Examples of light control devices include: 1) electrochromic elements featuring a material whose optical transmissivity reversibly changes upon application of current or voltage, 2) thermochromic elements featuring a material whose transmissivity varies with temperature, and 3) gas chromic elements featuring a material whose transmissivity is varied by controlling an atmosphere gas.

Of these, electrochromic elements are able to electrically control whether or not light and heat are transmitted. Accordingly, electrochromic elements allow the transmission of light and heat to be set as the user desires, and are extremely suitable as light control materials applied to building and vehicle glass. Furthermore, since these elements maintain the same optical characteristics when no current or voltage is being applied, less energy is required to maintain a constant state.

Although some configurations of electrochromic elements are liquids, in such cases leakage of the liquid must be prevented. Since buildings and vehicles are generally used for long periods of time, although technologically feasible, preventing the leakage of liquid for an extended period of time leads to higher costs. Accordingly, all of the materials that make up an electrochromic element suitable for building and automobile glass are preferably a solid such as tungsten oxide.

Tungsten oxide and other known electrochromic elements are based on the principle of controlling light by absorbing it with a light control material. Specifically, these elements suppress the advance of heat in the form of light into an interior by absorbing the light. However, when a light control material that works by this light control principle is used, a problem is that the light control material retains heat as a result of absorbing the light, and this heat is radiated back into the interior and ends up working its way into the light control glass.

A technique for solving this problem has been proposed, in which light is controlled by reflecting the light instead of absorbing it. That is, the entrance of heat into an interior caused by thermal absorption by a light control material can be prevented by using a reflection light control material which reversibly changes between a mirror state and a transparent state.

As an example of a reflection light control electrochromic elements having this characteristic, an electrochromic element having a reflection light control layers composed of an alloy of a rare earth metal and magnesium and a hydride thereof, a proton-conductive, transparent, oxidation protective layer, an anhydrous solid electrolyte layer, and an ion storage layer has been disclosed in a prior publication (see Patent Document 1).

With this element, the reflection light control layer has a function of controlling the reflectivity of the electrochromic element, and its reflectivity changes through the transfer of protons. The oxidation protective layer is composed, for example, of a compound having proton conductivity, such as niobium oxide, vanadium oxide, tantalum oxide, and other oxides, and magnesium fluoride, lead fluoride, and other fluorides, and prevents oxidation of the reflection light control layer.

The ion storage layer accumulates protons used to control reflectivity. When voltage is applied to light control glass having the above-mentioned element, protons move from the ion storage layer into the reflection light control layer via the solid electrolyte and the oxidation protective layer, which changes the reflectivity of the reflection light control layer. When voltage is applied in the opposite direction, protons are released from the reflection light control layer, and the reflectivity of the reflection light control layer returns to its original level. However, since expensive rare earth metals are used for the reflection light control layer with this element, application to a large surface area is difficult from the standpoint of cost.

As an example of another reflection light control device that uses an inexpensive and more practical material for the reflection light control layer, an element has been proposed in which Mg$_2$Ni is laminated as the reflection light control layer, while palladium or platinum is laminated as a catalyst layer (see Patent Document 2). However, this type of material was not at all practical because of its low transmissivity when the element is transparent. A magnesium/nickel alloy thin film developed by some of the inventors of the present invention (see Patent Document 3) is of the gas chromic type and makes use of hydrogen gas, having a visible light transmissivity thereof of about 50%, which is considerably higher than the level of 20% reported for Mg$_2$Ni in the past, and is close to being practical.

However, with an all solid state type light control mirror optical switch employing a magnesium/nickel alloy thin film (see Patent Document 4), the film is thin and has a yellowish tint in its transmissive state, and is not completely colorless and transparent. Since a yellowish color is undesirable in building and vehicle glass, this poses a major obstacle to practical application.

Patent Document 1: Japanese Patent Application Laid-Open No. 2000-204862
Patent Document 2: U.S. Pat. No. 6,647,166
Patent Document 3: Japanese Patent Application Laid-Open No. 2003-335553
Patent Document 4: Japanese Patent Application Laid-Open No. 2005-274630

In this situation, and in light of the above-mentioned prior art, the inventors conducted diligent and extensive research aimed at developing an electrochromic element capable of fundamentally solving these problems, and as a result succeeded in developing an all solid state type reflection light control electrochromic element employing a magnesium/titanium alloy thin film, which led to the completion of the present invention.

DISCLOSURE OF THE INVENTION

It is an object of the present invention to provide an all solid state type reflection light control electrochromic element, a light control material, and a light control member, in which a magnesium/titanium alloy thin film having high transmissivity when transparent is used for the reflection light control layer, which is made up of a multilayer structure in which an ion storage layer, a solid electrolyte layer, and a catalyst layer are laminated so that the transparency is achieved from the solid catalyst layer side of the reflection light control layer, and which is capable of switching in a short period of time over a large area.

To solve the above-mentioned problems, the present invention is constituted by the following technological means.

(1) A magnesium/titanium alloy-based all solid state type reflection light control electrochromic element having a multilayer thin film formed on a transparent substrate, comprising at least a transparent conductive film layer, an ion storage layer, a solid electrolyte layer, a catalyst layer, and a reflection light control layer of a magnesium/titanium alloy thin film which are formed on the substrate.

(2) The all solid state type reflection light control electrochromic element according to (1) above, wherein a reflection light control action is exhibited by applying voltage and/or current between the transparent conductive film layer and the reflection light control layer.

(3) The all solid state type reflection light control electrochromic element according to (1) above, wherein a transition metal oxide thin film is formed as an ion storage layer on a transparent substrate coated with a transparent conductive film.

(4) The all solid state type reflection light control electrochromic element according to (1) above, wherein a transparent oxide thin film is formed as a solid electrolyte layer over an ion storage layer.

(5) The all solid state type reflection light control electrochromic element according to (4) above, wherein the solid electrolyte layer is formed of tantalum oxide (Ta$_2$O$_5$).

(6) The all solid state type reflection light control electrochromic element according to (1) above, wherein a layer containing palladium, platinum, silver, or an alloy thereof is formed as a catalyst layer over the solid electrolyte layer.

(7) The all solid state type reflection light control electrochromic element according to (1) above, wherein a magnesium/titanium alloy-based thin film is formed as a reflection light control layer over the catalyst layer.

(8) The all solid state type reflection light control electrochromic element according to (1) or (7) above, wherein the magnesium/titanium alloy is MgTi$_x$ ($0.1 \leq x \leq 0.5$).

(9) The all solid state type reflection light control electrochromic element according to (1) above, wherein either the ion storage layer or the reflection light control layer is hydrogenated during production.

(10) The all solid state type reflection light control electrochromic element according to (1) above, having a transparent conductive film layer between the transparent substrate and the ion storage layer.

(11) The all solid state type reflection light control electrochromic element according to (1) above, having a transparent conductive film layer as an optional constitution on the outside of the reflection light control layer.

(12) A light control member, characterized by that the member is incorporated with the all solid state type reflection light control electrochromic element defined in any one of (1) to (11) above.

(13) The light control member according to (12) above, wherein the light control member is glass.

The present invention will now be described in further detail.

The present invention relates to an electrochromic element that is solid state and exhibits a reflection light control action when voltage is applied or current sent, and this electrochromic element is constituted by a transparent substrate on which are laminated a multilayer structure comprising a transparent conductive film, an ion storage layer, a solid electrolyte layer, a catalyst layer, and a reflection light control layer employing a magnesium/titanium based alloy thin film.

The thin films that constitute these layers can be produced, for example, by magnetron sputtering, vacuum deposition, electron beam deposition, chemical vapor deposition (CVD), plating, and other such methods. However, the method used to produce the thin films is not limited to these methods. These layers are preferably formed by using the above-mentioned magnetron sputtering apparatus, for example.

Next, the specific structure of the all solid state type reflection light control electrochromic element of the present invention will be described through reference to the drawings. In the following description, the all solid state type reflection light control electrochromic element is also referred to simply as an "electrochromic element". FIG. 1 is a cross sectional schematic showing an embodiment of the electrochromic element of the present invention.

In FIG. 1, an electrochromic element is constituted by a multilayer structure comprising a transparent substrate 10 (hereinafter also referred to as just a "substrate"), a transparent conductive film 20, an ion storage layer 30, a solid electrolyte layer 40, a catalyst layer 50, and a reflection light control layer 60 employing a magnesium/titanium alloy thin film (hereinafter also referred to as just a "reflection light control layer"). FIG. 1 is a simplified schematic drawing, and the thickness and size of the reflection light control plate of the present invention are not limited to the mode shown in the drawings.

In FIG. 1, although the transparent conductive layer 20, the ion storage layer 30, the solid electrolyte layer 40, the catalyst layer 50, and the reflection light control layer 60 are laminated over the substrate 10, other layers can also be laminated. For example, a transparent conductive film 70 can also be suitably laminated over the reflection light control layer 60.

FIG. 2 is a cross sectional schematic of an electrochromic element in which the transparent conductive film 70 is formed over the reflection light control layer 60. In some cases, a substrate 80 can also be suitably formed over the transparent conductive film 70 over the reflection light control layer 60. FIG. 3 is a cross sectional schematic of this electrochromic element.

In the present invention, the term "over" used in the description, such as in "over the catalyst layer" and elsewhere, is used in the sense of clearly indicating the direction of layers being laminated, and does not necessarily mean that the layers are disposed adjacent to one another. For example, when it is said that "a catalyst layer is formed over a solid electrolyte layer", this encompasses a case in which the solid electrolyte layer and the catalyst layer are disposed adjacent to one another, and a case in which the solid electrolyte layer and the catalyst layer are disposed with another layer interposed between them.

Although FIGS. 1 to 3 show an embodiment of the electrochromic element of the present invention, the technical scope of the present invention is not limited to or by these drawings. The present invention includes a mode in which, for example, two solid electrolyte layers are disposed. Also, with the present invention, a structure is preferably employed in which the layers, such as the transparent conductive layer 20, the ion storage layer 30, the solid electrolyte layer 40, the catalyst layer 50, and the reflection light control layer 60, are sandwiched between two substrates, for example.

Since a reflection light control layer is susceptible to oxidative deterioration by water and oxygen, disposing substrates on both sides reduces penetration by water and oxygen. An embodiment in which an electrochromic element already sandwiched between substrates composed of resin sheets is further sandwiched between a pair of glass plates is preferred for more effectively preventing the penetration of water and oxygen into the element.

FIG. 4 shows a cross sectional schematic of a reflection light control plate in which an electrochromic element is sandwiched between a pair of glass plates 100. A laminated glass interlayer film 90 made of polyvinyl butyral or the like can be interposed as needed between the glass plates 100 and the electrochromic element.

Because of its function, the electrochromic element of the present invention can be favorably applied to light control members used in building materials, automobile parts, and so forth. As for building materials, window glass is a typical application of such members. In the case of automobile parts, examples include window glass, sun roofs, exterior paneling, and interior trim, and the element of the present invention can be used to particular advantage in window glass and sun roofs. Using the electrochromic element of the present invention makes it possible to control the amount of energy transmitted from sunlight, and maintain a comfortable interior space.

The various members that constitute the electrochromic element of the present invention will now be described. There are no particular limitations on the material and shape of the substrate, as long as it functions as a substrate for an electrochromic element. The substrate preferably functions not only as the foundation for forming the transparent conductive layer, ion storage layer, solid electrolyte layer, catalyst layer, and reflection light control layer, but also as a barrier for minimizing the penetration of water and oxygen.

More specifically, favorable examples of substrates include glass and resin sheets. When a resin sheet is used, a material that does not generate much outgas is preferable in terms of maintaining a reduced pressure since the deposition of the layers is carried out under reduced pressure conditions. Also, the resin sheet is preferably colorless and transparent, but a colored sheet can be used as needed.

From the standpoints of price, transparency, heat resistance, and so forth, the resin that is used is preferably polyethylene terephthalate (PET), polyethylene naphthalate (PEN), nylon, acrylic, or the like. If two substrates are used, there are no particular limitations on their combination.

For example, a suitable combination of substrates can be selected from among materials such as glass and resin sheets. Examples include combining glass with glass, combining glass with a resin sheet, and combining a resin sheet with another resin sheet. As shown in FIG. 4, when the electrochromic element is further sandwiched between glass plates, the substrate is preferably a resin sheet. The work process can be simplified by using a substrate on which a transparent conductive film has been formed in advance for the transparent conductive film that goes over the substrate 10.

The transparent conductive film 20 is composed of an electroconductive material, and is used to control reflectivity by applying voltage and/or sending current to the electrochromic element. There are no particular limitations on the material of the transparent conductive film, and any known material can be used as appropriate.

The ion storage layer 30 is a layer capable of reversibly storing and removing protons required to switch the reflection light control layer between a transparent state and mirror state. An ion storage layer that is colored can be used as necessary when protons are removed, but it is preferable to use a material having the characteristic of being colorless and transparent. A transition metal oxide is a favorable example of the constituent material. Examples include tungsten oxide, molybdenum oxide, niobium oxide, and vanadium oxide. Any known material having an ion storage function can be used as appropriate here.

Among these, tungsten oxide is preferable as a constituent material of the electrochromic element since it has high stability ($10^6$ cycles or more). However, the material is not limited to this, and any material with a similar effect can be used instead. There are no particular limitations on the thickness of the storage layer 30, but it is preferably between 250 and 2000 nm.

For the solid electrolyte layer 40 is used a material having the characteristic of allowing protons to move easily upon the application of voltage. Since it is a solid, this solid electrolyte layer can be used stably for an extended period of time. A transparent oxide is a favorable example of the constituent material. Also, the electrolyte is preferably anhydrous since the presence of moisture can cause oxidation deterioration of the reflection light control layer that contains magnesium and titanium.

Specific examples of constituent components of the solid electrolyte layer 40 include tantalum oxide and zirconium oxide. However, the material is not limited to these, and any material with a similar effect can be used instead. A known solid electrolyte material can be used here.

The catalyst layer 50 over which the reflection light control layer is formed functions as an entry and exit for the supply and release of protons to and from the reflection light control layer. Favorable components of the catalyst layer which improve the rate of supply and release of protons by the catalyst layer and enhance switching between a mirror state and a transparent state are palladium, platinum, and palladium alloys, which all have high proton permeation capability. Preferable examples of palladium alloys include palladium/silver alloys and palladium/platinum alloys. In some cases characteristics can be improved by adding other components to the palladium alloy.

Also, since this is an alloy, the admixture of a certain amount of impurities is permitted, but the amount of impurities admixed is preferably low. Although there are no particular limitations on the thickness of the catalyst layer 50, it is preferably between 0.5 and 10 nm. If the catalyst layer is too thin it will not be able to function adequately as a catalyst. Conversely, if the catalyst layer is too thick, the light transmissivity of the catalyst layer will decrease. Also, once a certain thickness is exceeded, then further increases of the catalyst layer thickness will not improve its function as a catalyst.

The reflection light control layer 60 is made from a material which changes between a transparent state and mirror state as a result of the occlusion and release of hydrogen and protons, and exhibits a reflection light control function. The reflection light control layer is composed of an alloy containing magnesium and titanium. The reflection light control layer is preferably composed of a magnesium/titanium alloy in which the ratio between titanium and magnesium is within the range of 0.1 to 0.5 part titanium per 1 part magnesium. In particular, a magnesium/titanium alloy in which this range is from 0.1 to 0.3 tends to exhibit higher transmissivity when it becomes transparent as a result of hydrogen occlusion.

In some cases, it is possible to improve characteristics by adding other components to the magnesium/titanium alloy. With the present invention, even if components other than magnesium and titanium are contained, they are included in the concept of a magnesium/titanium alloy of the present invention provided that the characteristics of a magnesium/titanium alloy are retained. Even if the characteristics of the magnesium/titanium alloy should be diminished, other components are still included in the concept of a magnesium/titanium alloy as long as the crystal structure of the magnesium/titanium alloy is partially retained.

Also, since this is an alloy, the admixture of a certain amount of impurities is permitted, but the amount of impurities admixed is preferably low. The thickness of the reflection light control layer 60 is preferably about 20 to 200 nm. If the reflection light control layer is too thin, light reflectivity in the mirror state will decrease and adequate reflection characteristics will not be exhibited. Conversely, if the reflection light control layer is too thick, light transmissivity in the transparent state will decrease. Although different specifications will be called for depending on the application, this can be handled by controlling the film thickness.

A laminated structure serving as an electrochromic element can be constructed by providing a proton accumulating layer and an electrolyte layer over a transparent substrate provided with a transparent conductive film, and then forming a catalyst layer, a reflection light control layer, and a transparent conductive film over this. The order in which these layers are produced can be such that the proton accumulating layer and the electrolyte layer are provided over the substrate provided with the transparent conductive film, and the catalyst layer, the reflection light control layer, and the transparent conductive film are provided over these, or conversely, can be such that the reflection light control layer and the catalyst layer are provided over the substrate provided with the transparent conductive film, and the electrolyte layer and the proton accumulating layer, and preferably, the transparent conductive film, are provided.

The light control operation of an all solid state type reflection light control electrochromic element is carried out by applying voltage and sending current between the ion storage layer and the reflection light control layer. Specifically, if positive voltage is applied to the transparent conductive film layer 20 and negative voltage is applied to the reflection light control layer 60 when the electrochromic element is in a mirror state, protons stored in the ion storage layer 30 diffuse into the reflection light control layer 60 through the solid electrolyte layer 40 and the catalyst layer 50, which brings about hydrogenation, so that the reflection characteristics change from a mirror state to a transparent state.

Here, the catalyst layer 50 has the function of promoting the transfer of protons between the solid electrolyte layer 40 and the reflection light control layer 60, and adequate switching speed is ensured in the reflection light control layer 60 by this catalyst layer 50. Conversely, if negative voltage is applied to the ion storage layer 30 and positive voltage is applied to the reflection light control layer 60 when the electrochromic element is in a transparent state, hydrides within the reflection light control layer 60 are dehydrogenated, and the reflection characteristics return from a transparent state to a mirror state. The released hydrogen returns in the form of protons through the catalyst layer 50 and the solid electrolyte layer 40 to the ion storage layer 30, and is stored therein.

The following effects are exhibited by the present invention.

(1) An all solid state type reflection light control electrochromic element employing a magnesium/titanium alloy thin film material having superior reflection light control characteristics can be provided.

(2) A multilayer structure of an all solid state type reflection light control electrochromic element can be provided with which the amount of transmitted sunlight energy can be controlled and a comfortable interior space can be maintained.

(3) A light control member can be provided such as glass which incorporates the above-mentioned all solid state type reflection light control electrochromic element.

(4) A novel all solid state type reflection light control electrochromic element can be provided with which the transmission of sunlight entering through window glass can be electrically controlled by electrically and reversibly changing the glass surface from a mirror state to a transmissive state.

(5) A reflection light control electrochromic element and light control member can be provided which allows switching from a reflecting state to a transparent state in a short period of time and over a large surface area, and which can be used to particular advantage for light control of window glass and the like.

BEST MODE FOR CARRYING OUT THE INVENTION

The present invention will now be described in specific terms on the basis of working examples, but is not in any way limited by the following examples.

Working Example 1

Figure 1:
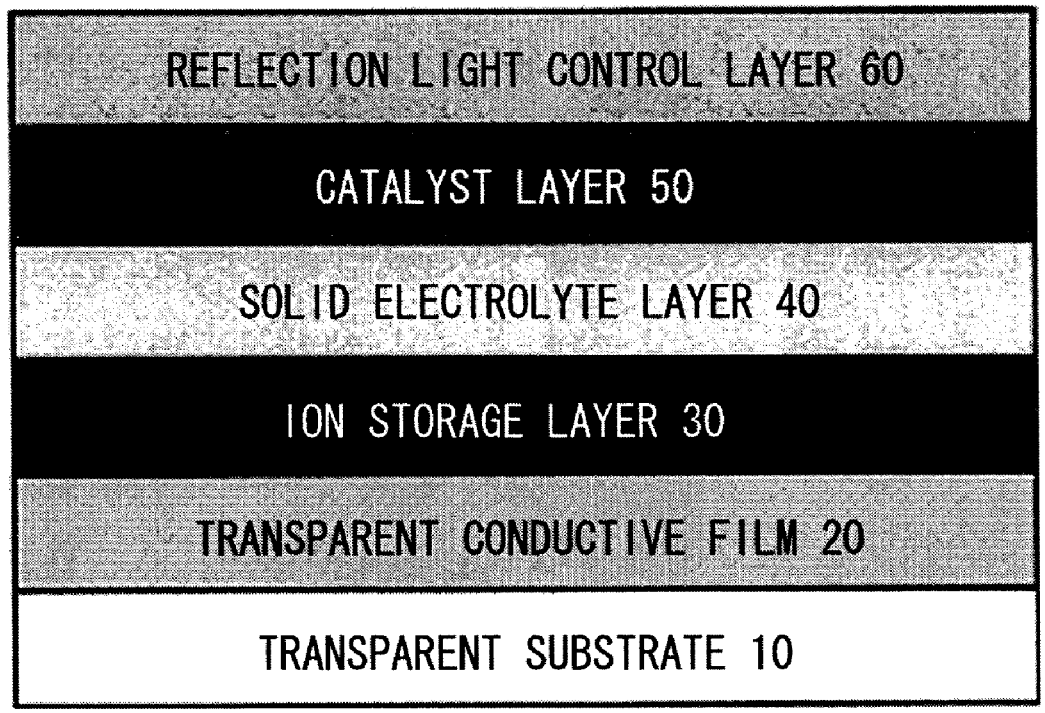
FIG. 1 is a cross sectional schematic showing an example of the element of the present invention (all solid state type reflection light control electrochromic element 1)
Figure 2:
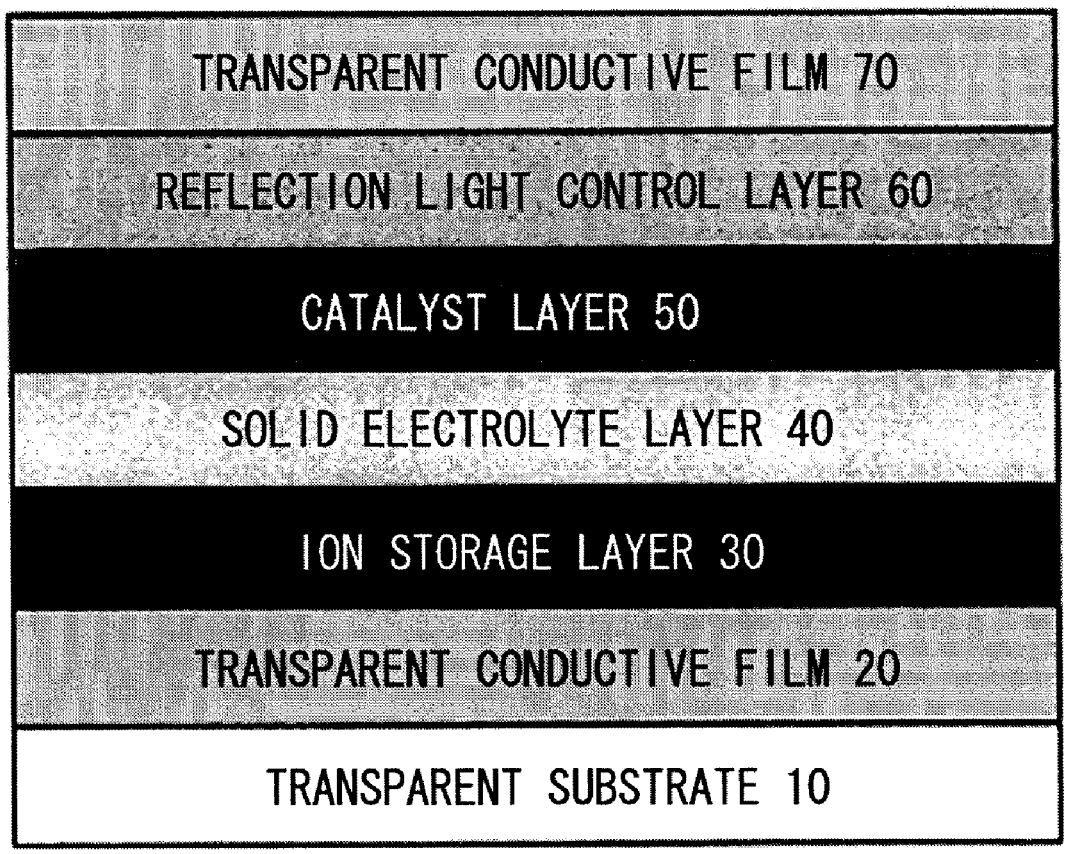
FIG. 2 is a cross sectional schematic of another example of the element of the present invention (all solid state type reflection light control electrochromic element 2)
Figure 3:
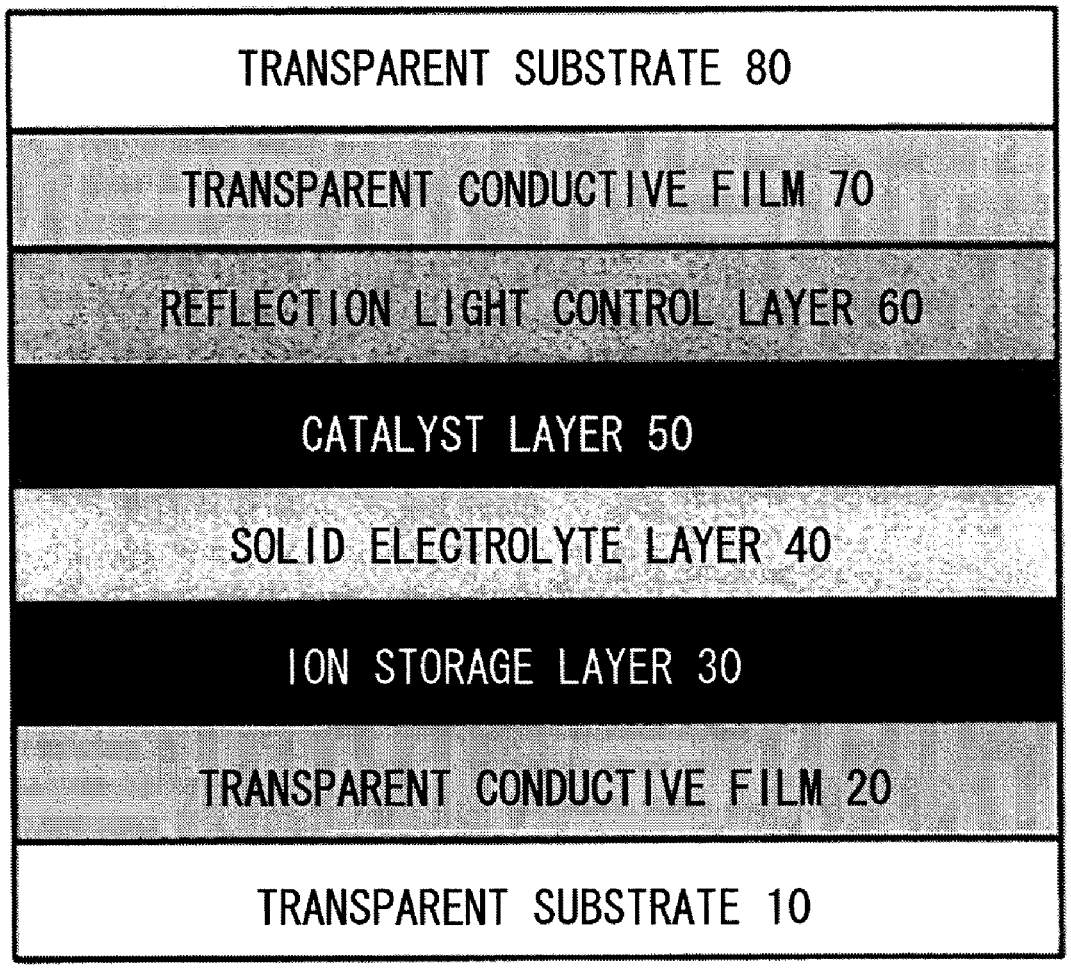
FIG. 3 is a cross sectional schematic of another example of the element of the present invention (all solid state type reflection light control electrochromic element 3)
Figure 4:
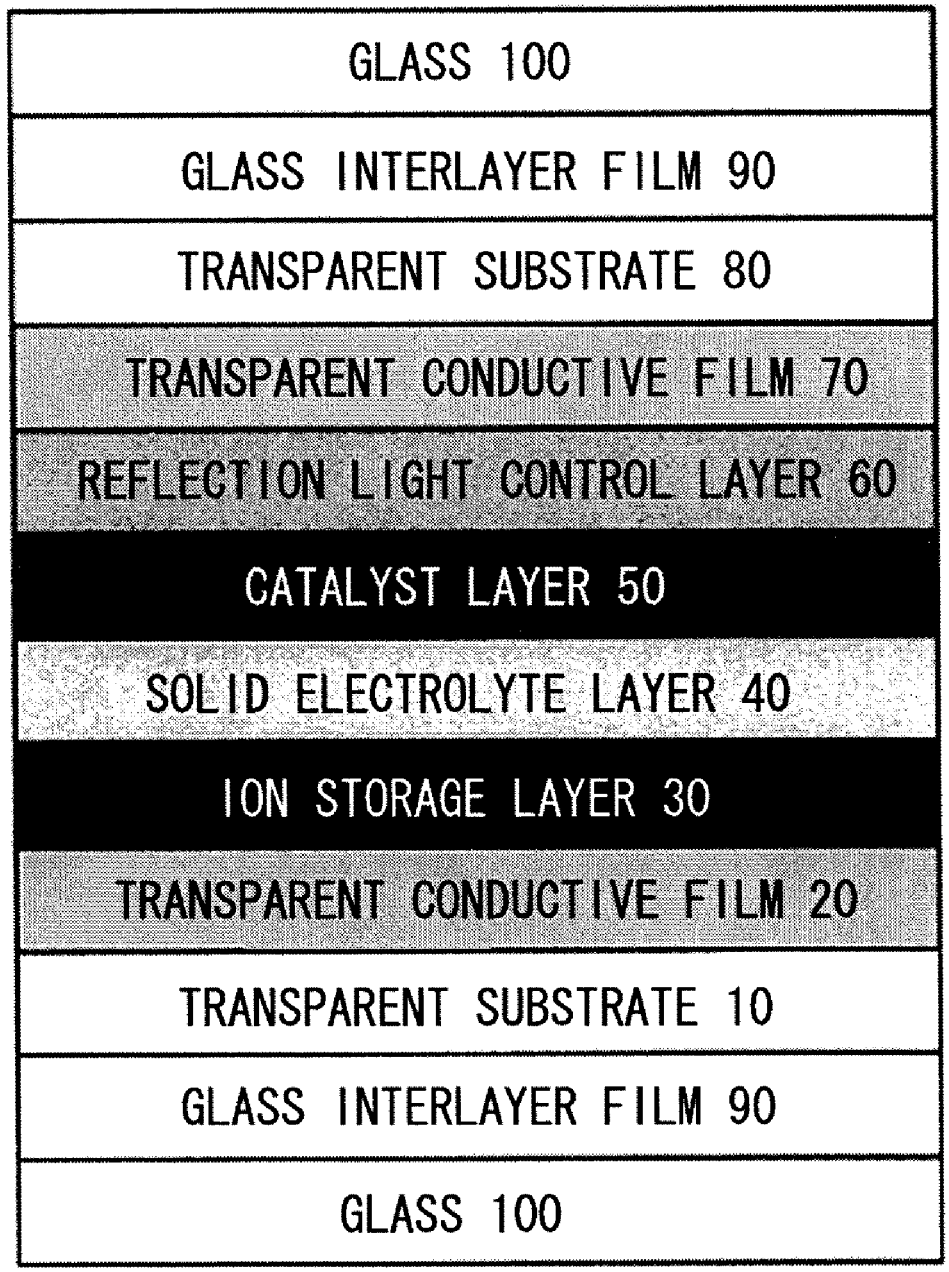
FIG. 4 is a cross sectional schematic of another example of the element of the present invention (all solid state type reflection light control electrochromic element 4)

First, a first working example of the present invention will be described through reference to FIG. 1. The all solid state type reflection light control electrochromic element shown in FIG. 1 was used in this example. An embodiment of the manufacturing method will be described below in the order of the steps, but the technical scope of the present invention is not limited to the following procedure. With the present invention, an electrochromic element can be produced, for example, by forming a transparent conductive film, a reflection light control layer, and a catalyst layer over a first substrate, then forming a transparent conductive film, an ion storage layer, and a solid electrolyte layer over a second substrate, and bonding these together. It was also confirmed that this element can be produced by the same process when the constituent components of the various layers are changed to other materials.

In this working example, a glass plate having a surface resistance of 10Ω/□ and a thickness of 1 mm, and which was coated with a transparent conductive film of tin-doped indium oxide, was used as a substrate. This was washed, after which it was placed in a vacuum apparatus and degassed. A tungsten oxide thin film was deposited on the substrate with a magnetron sputtering apparatus. The film was formed using reactive DC sputtering in which a metallic tungsten target was sputtered in a mixed atmosphere of argon, oxygen, and hydrogen.

The mixed atmosphere was controlled by controlling the flow rates of argon gas, oxygen gas, and hydrogen gas. The ratio of the flow rates of the argon gas, oxygen gas, and hydrogen gas was 10:2:5, and sputtering was performed by DC sputtering at a pressure of 1 Pa inside the vacuum tank, and with a power of 60 W applied to the tungsten. The thickness of the tungsten oxide thin film thus produced was about 1000 nm. The resulting tungsten oxide thin film had a bronzed, deep blue color due to the effect of hydrogen introduction.

A tantalum oxide thin film was produced over the tungsten oxide thin film by reactive DC sputtering in the same manner as the above-mentioned tungsten oxide thin film. The film was formed by sputtering a metallic tantalum target in a mixed atmosphere of argon and oxygen. The mixed atmosphere was controlled by controlling the flow rates of the argon gas and oxygen gas. The ratio of the flow rates of the argon gas and oxygen gas was 3:1, and sputtering was performed by DC sputtering at a pressure of 0.7 Pa inside the vacuum tank, and with a power of 65 W applied to the tantalum target.

The thickness of the tantalum oxide thin film thus produced was about 400 nm, and the density was about 3.8 g/cm$^3$. The color of the tantalum oxide film did not change, and remained deep blue even after deposition of the film onto the tungsten oxide thin film.

A three-way magnetron sputtering apparatus was used to vapor deposit a palladium catalyst layer and a magnesium/titanium alloy thin film reflection light control layer onto the surface of the two-layer tantalum oxide/tungsten oxide film. Targets consisting of metallic palladium, metallic magnesium, and metallic titanium were set up corresponding to three sputtering guns. In forming the films, the palladium was sputtered first, followed by vapor deposition of a catalyst layer in the form of a palladium thin film in a thickness of about 4 nm.

The pressure of the argon gas during sputtering was 0.6 Pa, and sputtering was performed by DC sputtering, with a power of 45 W applied to the palladium. After this, a magnesium/titanium alloy thin film was vapor deposited in a thickness of about 40 nm by applying a power of 27 W to the magnesium and a power of 67 W to the titanium. The composition of the magnesium and titanium at this point was approximately MgTi$_{0.21}$. An indium electrode was formed to the magnesium/titanium alloy thin film. The initial state of this switching device was a mirror state.

Working Example 2

Figure 5:
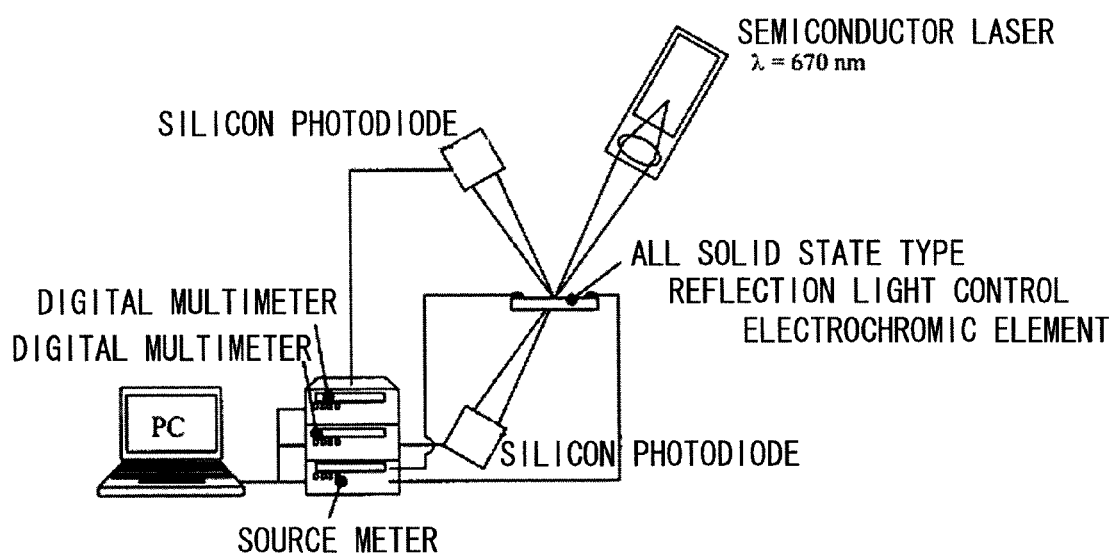
FIG. 5 is a schematic of an apparatus for evaluating the characteristics of an all solid state type reflection light control electrochromic element.

In this example, the multilayer film obtained in Working Example 1 was mounted in an evaluation apparatus as shown in FIG. 5, and the optical switching characteristics were investigated. A voltage of ±5 V was applied between the tin-doped indium oxide and the indium, and the change in optical transmissivity was measured with a measurement system combining a semiconductor laser having a wavelength of 670 nm and a silicon photodiode.

Since the magnesium/titanium alloy thin film serving as the light control layer in the multilayer film had a metallic gloss immediately after production, it reflected light well (optical reflectivity: ≦40%), and since the tungsten oxide thin film serving as the ion storage layer had a deep blue color, the transmissivity was extremely low (optical transmissivity: ≦0.1%). When a −5 V voltage was applied to the indium electrode side of this multilayer film, the protons in the tungsten oxide thin film were released due to the effect of the electrical field, transferred through the solid electrolyte layer, and then introduced into the magnesium/titanium alloy thin film.

Figure 6:
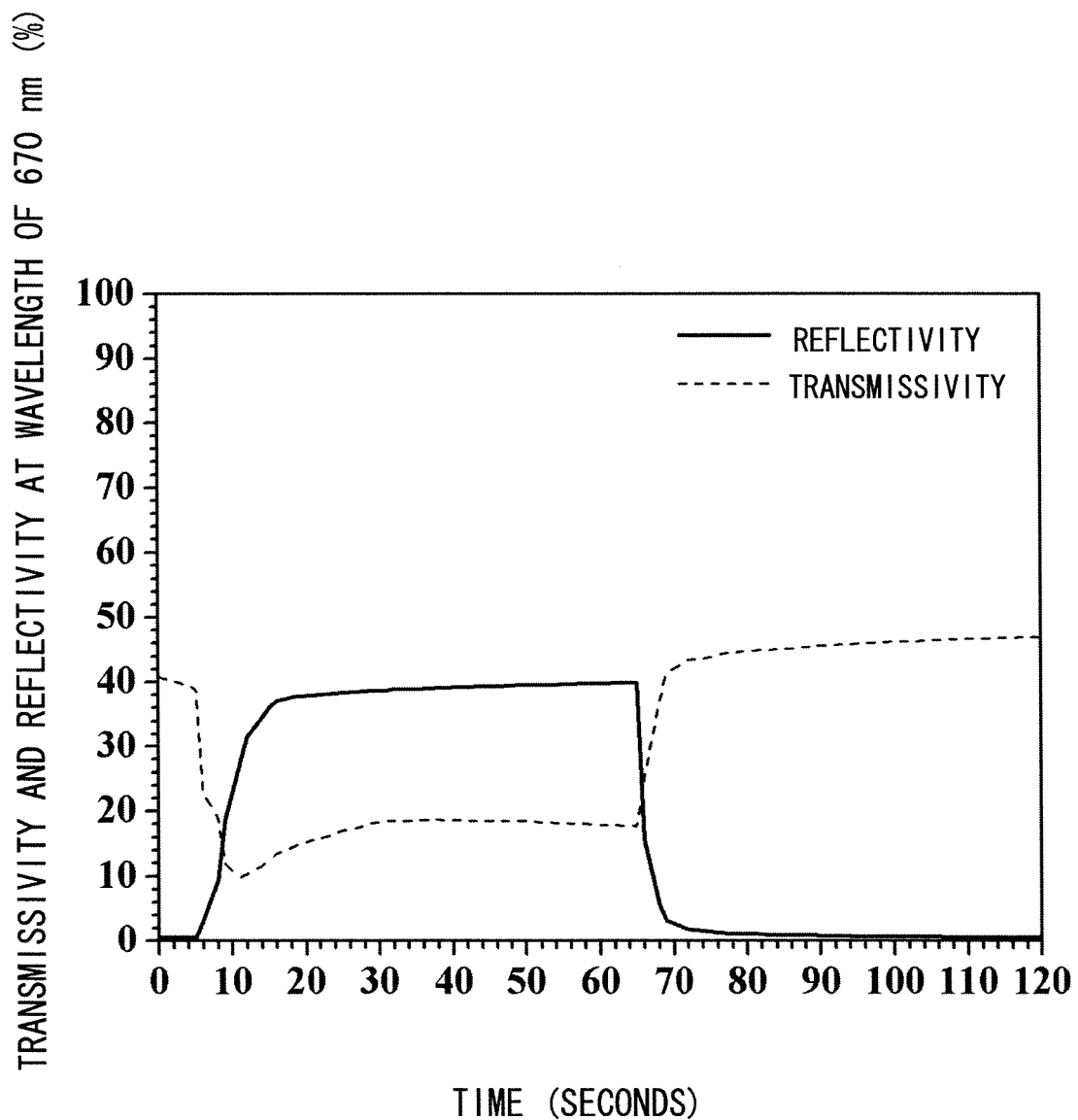
FIG. 6 shows the switching characteristics of an all solid state type reflection light control electrochromic element (the change in the optical transmissivity and optical reflectivity at a wavelength of 670 nm)
Figure 7:
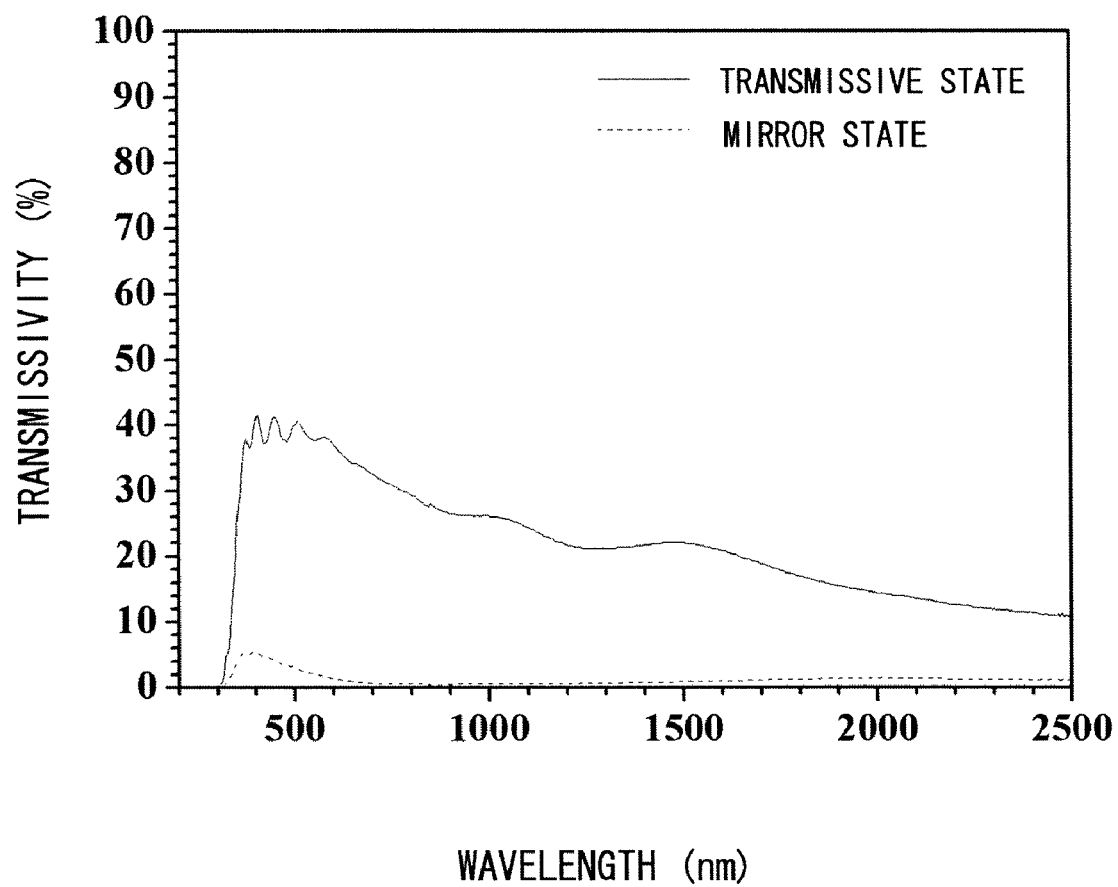
FIG. 7 shows the transmission spectrum of an all solid state type reflection light control electrochromic element.

As a result, the tungsten oxide thin film becomes transparent, and hydrogenation occurs in the magnesium/titanium alloy thin film, thereby causing it to become transparent as well (optical reflectivity: ≦15%, optical transmissivity: ≦41%). The changes over time in optical transmissivity here are shown in FIG. 6. In FIG. 6, this change took only about 10 seconds, indicating an extremely fast response. FIG. 7 shows the transmission spectra before and after voltage application. In the wavelength band of visible light, a substantially uniform transmissivity of about 40% was exhibited.

It can be seen from these results that a transmissive state means the film is substantially colorless and transparent. Conversely, when a +5 V voltage was applied to the indium electrode side, transmissivity decreased in about 5 seconds and the film returned to a mirror state. Consequently, it was found that this element could be switched reversibly between a mirror state and transparent state by changing the polarity of the applied voltage. Also, the results were substantially the same with a multilayer film produced using molybdenum oxide, niobium oxide, vanadium oxide, or another such transition metal oxide as the ion storage layer, and zirconium oxide as the solid electrolyte.

INDUSTRIAL APPLICABILITY

As discussed in detail above, the present invention relates to an all solid state type reflection light control electrochromic element employing a magnesium/titanium alloy thin film material having superior reflection light control characteristics, and the present invention provides an all solid state type reflection light control electrochromic element with which the transmission of sunlight through window glass, for example, can be electrically controlled by reversibly and electrically changing the glass surface from a mirror state to a transmissive state. The present invention also provides an all solid state type reflection light control electrochromic element, and a light control member incorporating this element, with which the amount of transmitted sunlight energy can be controlled as the user wishes, allowing an interior space to be kept comfortable.

The invention claimed is:

1. A magnesium/titanium alloy-based all solid state type reflection light control electrochromic element, having a multilayer thin film formed on a transparent substrate, wherein the multilayer thin film comprises:
    a transparent conductive film layer;
    an ion storage layer;
    a solid electrolyte layer;
    a catalyst layer; and
    a reflection light control layer of a magnesium/titanium alloy thin film.

2. The element of claim 1, wherein a reflection light control action is exhibited by applying at least one selected from the group consisting of a voltage and a current, between the transparent conductive film layer and the reflection light control layer.

3. The element of claim 1, wherein a transition metal oxide thin film is formed as the ion storage layer on the transparent substrate, and the transparent substrate is coated with the transparent conductive film layer.

4. The element of claim 3, wherein the transition metal oxide thin film comprises a material selected from the group consisting of tungsten oxide, molybdenum oxide, niobium oxide, and vanadium oxide.

5. The element of claim 3, wherein the transition metal oxide thin film comprises tungsten oxide.

6. The element of claim 3, wherein a thickness of the transition metal oxide thin film is between 250 and 2000 nm.

7. The element of claim 1, wherein a transparent oxide thin film is formed as the solid electrolyte layer over the ion storage layer.

8. The element of claim 7, wherein the solid electrolyte layer is formed of tantalum oxide ($Ta_2O_5$).

9. The element of claim 1, wherein a layer comprising palladium, platinum, silver, or an alloy thereof is formed as the catalyst layer over the solid electrolyte layer.

10. The element of claim 9, wherein the catalyst layer comprises a palladium/silver alloy or a palladium/platinum alloy.

11. The element of claim 1, wherein a magnesium/titanium alloy-based thin film is formed as the reflection light control layer over the catalyst layer.

12. The element of claim 11, wherein a magnesium/titanium alloy of the magnesium/titanium alloy-based thin film is $MgTi_x$, and $0.1 \leq x \leq 0.5$.

13. The element of claim 11, wherein a magnesium/titanium alloy of the magnesium/titanium alloy-based thin film is $MgTi_x$, and $0.1 \leq x \leq 0.3$.

14. The element of claim 1, wherein a magnesium/titanium alloy of the element is $MgTi_x$, and $0.1 \leq x \leq 0.5$.

15. The element of claim 1, wherein either the ion storage layer or the reflection light control layer is hydrogenated during production.

16. The element of claim 1, wherein the transparent conductive film layer is between the transparent substrate and the ion storage layer.

17. The element of claim 1, further comprising a second transparent conductive film layer outside of the reflection light control layer.

18. A light control member, comprising, the element of claim 1.

19. The light control member of claim 18, wherein the light control member is glass.

20. The element of claim 1, wherein an electrolyte of the solid electrolyte layer is anhydrous.

* * * * *